US011439170B2

(12) United States Patent
Harada

(10) Patent No.: US 11,439,170 B2
(45) Date of Patent: Sep. 13, 2022

(54) ACIDIC LIQUID SEASONING CONTAINING PLANT-DERIVED CRUSHED MATERIALS

(71) Applicants: MIZKAN HOLDINGS CO., LTD., Aichi (JP); MIZKAN CO.,LTD., Aichi (JP)

(72) Inventor: Takahiro Harada, Aichi (JP)

(73) Assignees: Mizkan Holdings Co., Ltd., Aichi (JP); MIZKAN CO., LTD., Aichi (JP)

( * ) Notice: Subject to any disclaimer, the term of this patent is extended or adjusted under 35 U.S.C. 154(b) by 42 days.

(21) Appl. No.: 16/961,052

(22) PCT Filed: Jan. 10, 2019

(86) PCT No.: PCT/JP2019/000583
§ 371 (c)(1),
(2) Date: Jul. 9, 2020

(87) PCT Pub. No.: WO2019/139096
PCT Pub. Date: Jul. 18, 2019

(65) Prior Publication Data
US 2021/0059286 A1    Mar. 4, 2021

(30) Foreign Application Priority Data
Jan. 10, 2018   (JP) .............................. JP2018-002217

(51) Int. Cl.
*A23L 27/00*     (2016.01)
*A23L 19/00*     (2016.01)
*A23L 27/60*     (2016.01)

(52) U.S. Cl.
CPC ............... *A23L 27/82* (2016.08); *A23L 19/09* (2016.08); *A23L 27/60* (2016.08)

(58) Field of Classification Search
CPC .......... A23L 27/82; A23L 19/09; A23L 27/60
USPC ........................................................ 426/650
See application file for complete search history.

(56) References Cited

U.S. PATENT DOCUMENTS

| 5,215,769 A | 6/1993 | Fox et al. |
| 2018/0317533 A1 | 11/2018 | Ohike |

FOREIGN PATENT DOCUMENTS

| DE | 202014103584 U1 | 8/2014 |
| JP | H03-228663 A | 10/1991 |
| JP | 2003-169624 A | 6/2003 |
| JP | 2007-236213 A | 9/2007 |
| JP | 2008-17719 A | 1/2008 |
| JP | 2008-253161 A | 10/2008 |

(Continued)

OTHER PUBLICATIONS

Translation of JP-2017123817-A (Year: 2017).*

(Continued)

*Primary Examiner* — Brent T O'Hern
(74) *Attorney, Agent, or Firm* — Osha Bergman Watanabe & Burton LLP

(57) ABSTRACT

The present invention facilitates the elimination of foam generated in an acidic liquid seasoning containing plant-derived crushed materials after the seasoning is mixed by stirring/shaking. This acidic liquid seasoning contains plant-derived crushed materials, gums, a cold water swellable starch, and a vinegar, wherein (A) the viscosity at 20° C. is 500 to 10,000 mPa·s, and (B) the dissociated acetic acid concentration is 0.15 mass % or less.

11 Claims, 7 Drawing Sheets

(56) References Cited

FOREIGN PATENT DOCUMENTS

| JP | 2014-103928 A | 6/2014 | | |
|---|---|---|---|---|
| JP | 2017-099307 A | 6/2017 | | |
| JP | 2017-099308 A | 6/2017 | | |
| JP | 2017-123817 A | 7/2017 | | |
| JP | 2017123817 A | * 7/2017 | ............. | A23L 27/18 |

OTHER PUBLICATIONS

International Search Report issued in International Application No. PCT/JP2019/000583, dated Mar. 26, 2019 (1 page).
Written Opinion issued in International Application No. PCT/JP2019/000583, dated Mar. 26, 2019 (5 pages).
Office Action issued in corresponding Singaporean Application No. 11202005915W, dated Sep. 28, 2021 (10 pages).
Extended European Search Report issued in corresponding European Application No. 19738264.1, dated Sep. 9, 2021 (11 pages).

* cited by examiner

Table 1

| | | | No.1 | No.2 | No.3 | No.4 | No.5 | No.6 | No.7 | No.8 |
|---|---|---|---|---|---|---|---|---|---|---|
| Composition | | | | | | | | | | |
| Crushed plant material | Tomato paste | kg | 50 | 50 | 50 | 50 | 50 | 50 | 50 | 50 |
| | Mass percentage | % by mass | 5 | 5 | 5 | 5 | 5 | 5 | 5 | 5 |
| Gum | Xanthane gum | kg | 0 | 15 | 5 | 3 | 10 | 15 | 20 | 1 |
| | Mass percentage | % by mass | 0.00 | 1.50 | 0.50 | 0.30 | 1.00 | 1.50 | 2.00 | 0.10 |
| Cold water swellable starch | | kg | 25 | 0 | 5 | 10 | 10 | 10 | 10 | 25 |
| | Mass percentage | % by mass | 2.5 | 0 | 0.5 | 1 | 1 | 1 | 1 | 2.5 |
| Total mass percentage of thickeners (gum + cold water swellable starch) | | % by mass | 2.5 | 1.5 | 1 | 1.3 | 2 | 2.5 | 3 | 2.6 |
| Mass ratio of (gum)/(Cold water swellable starch) | | - | 0 | - | 1 | 0.3 | 1 | 1.5 | 2 | 0.04 |
| Vinegar | Vinegar (acidity 15%) | kg | 50 | 50 | 50 | 50 | 50 | 50 | 50 | 50 |
| Sugar | Sucrose | kg | 100 | 100 | 100 | 100 | 100 | 100 | 100 | 100 |
| Sodium chloride | Sodium chloride | kg | 30 | 30 | 30 | 30 | 30 | 30 | 30 | 30 |
| Remainder | Water | kg | Remainder | Remainder | Remainder | Remainder | Remainder | Remainder | Remainder | Remainder |
| Total | | kg | 1000 | 1000 | 1000 | 1000 | 1000 | 1000 | 1000 | 1000 |
| Mass percentage of all 100-mesh-on ingredients | | % by mass | 47.5 | 10.0 | 17.5 | 25.0 | 25.0 | 25.0 | 25.0 | 47.5 |
| Mass percentage of 100-mesh-on swollen particles of crushed plant material | | % by mass | 10.0 | 10.0 | 10.0 | 10.0 | 10.0 | 10.0 | 10.0 | 10.0 |
| Mass percentage of 9-mesh-pass/100-mesh-on swollen particles of crushed plant material | | % by mass | 10.0 | 10.0 | 10.0 | 10.0 | 10.0 | 10.0 | 10.0 | 10.0 |
| Mass percentage of 4-mesh-pass/100-mesh-on swollen particles of cold water swellable starch | | % by mass | 37.5 | 0 | 7.5 | 15.0 | 15.0 | 15.0 | 15.0 | 37.5 |
| Properties | | | | | | | | | | |
| pH(20°C) | | - | 3.60 | 3.60 | 3.60 | 3.60 | 3.60 | 3.60 | 3.60 | 3.60 |
| Acetic acid concentration | | % by mass | 0.75 | 0.75 | 0.75 | 0.75 | 0.75 | 0.75 | 0.75 | 0.75 |
| Dissociated acetic acid concentration | | % by mass | 0.049 | 0.049 | 0.049 | 0.049 | 0.049 | 0.049 | 0.049 | 0.049 |
| Viscosity (20°C) | | mPa·s | 309 | 8703 | 3061 | 1948 | 5912 | 8743 | 11574 | 875 |
| Sensory Evaluation | | | | | | | | | | |
| Foam breaking property after shaking | | Panelist 1 | C | C | A | A | A | A | C | B |
| | | Panelist 2 | C | C | A | A | A | A | C | A |
| | | Panelist 3 | B | C | A | A | A | B | C | A |
| | | Panelist 4 | B | C | A | A | A | A | C | A |
| | | Panelist 5 | C | C | A | A | B | B | B | A |
| Color tone after shaking | | Panelist 1 | C | C | A | A | A | A | C | B |
| | | Panelist 2 | C | C | A | A | A | A | C | B |
| | | Panelist 3 | C | C | A | A | B | B | C | A |
| | | Panelist 4 | C | C | A | A | A | A | C | A |
| | | Panelist 5 | C | C | A | A | B | B | B | A |

FIG. 1

Table 2

| | | | No.9 | No.10 | No.11 |
|---|---|---|---|---|---|
| Composition | | | | | |
| Crushed plant material | Tomato paste | kg | 3 | 100 | 200 |
| | Mass percentage | % by mass | 0.3 | 10 | 20 |
| Gum | Xanthane gum | kg | 3 | 3 | 3 |
| | Mass percentage | % by mass | 0.30 | 0.30 | 0.30 |
| Cold water swellable starch | | kg | 10 | 10 | 10 |
| | Mass percentage | % by mass | 1 | 1 | 1 |
| Total mass percentage of thickeners (gum + cold water swellable starch) | | % by mass | 1.3 | 1.3 | 1.3 |
| Mass ratio of (gum)/ (Cold water swellable starch) | | - | 0.3 | 0.3 | 0.3 |
| Vinegar | Vinegar (acidity 15%) | kg | 50 | 50 | 50 |
| Sugar | Sucrose | kg | 100 | 100 | 100 |
| Sodium chloride | Sodium chloride | kg | 30 | 30 | 30 |
| Remainder | Water | kg | Remainder | Remainder | Remainder |
| Total | | kg | 1000 | 1000 | 1000 |
| Mass percentage of all 100-mesh-on ingredients | | % by mass | 15.6 | 35.0 | 55.0 |
| Mass percentage of 100-mesh-on swollen particles of crushed plant material | | % by mass | 0.6 | 20.0 | 40.0 |
| Mass percentage of 9-mesh-pass/ 100-mesh-on swollen particles of crushed plant material | | % by mass | 0.6 | 20.0 | 40.0 |
| Mass percentage of 4-mesh-pass/ 100-mesh-on swollen particles of cold water swellable starch | | % by mass | 15.0 | 15.0 | 15.0 |
| Properties | | | | | |
| pH(20°C) | | - | 3.20 | 3.80 | 4.00 |
| Acetic acid concentration | | % by mass | 0.75 | 0.75 | 0.75 |
| Dissociated acetic acid concentration | | % by mass | 0.020 | 0.074 | 0.111 |
| Viscosity (20°C) | | mPa·s | 1751 | 2158 | 2578 |
| Sensory Evaluation | | | | | |
| Foam breaking property after shaking | | Panelist 1 | A | A | A |
| | | Panelist 2 | A | A | A |
| | | Panelist 3 | A | A | A |
| | | Panelist 4 | A | A | A |
| | | Panelist 5 | A | A | A |
| Color tone after shaking | | Panelist 1 | A | A | A |
| | | Panelist 2 | A | A | A |
| | | Panelist 3 | A | A | A |
| | | Panelist 4 | A | A | A |
| | | Panelist 5 | A | A | A |

FIG. 2

Table 3

| | | | No.12 | No.13 | No.14 | No.15 | No.16 | No.17 |
|---|---|---|---|---|---|---|---|---|
| Composition | | | | | | | | |
| Crushed plant material | Tomato paste | kg | 10 | 100 | 100 | 100 | 100 | 100 |
| | Mass percentage | % by mass | 1 | 10 | 10 | 10 | 10 | 10 |
| Gum | Xanthane gum | kg | 6 | 6 | 6 | 6 | 6 | 6 |
| | Mass percentage | % by mass | 0.60 | 0.60 | 0.60 | 0.60 | 0.60 | 0.60 |
| Cold water swellable starch | | kg | 10 | 10 | 10 | 10 | 10 | 10 |
| | Mass percentage | % by mass | 1 | 1 | 1 | 1 | 1 | 1 |
| Total mass percentage of thickeners (gum + cold water swellable starch) | | % by mass | 1.6 | 1.6 | 1.6 | 1.6 | 1.6 | 1.6 |
| Mass ratio of (gum)/(Cold water swellable starch) | | - | 0.6 | 0.6 | 0.6 | 0.6 | 0.6 | 0.6 |
| Vinegar | Vinegar (acidity 15%) | kg | 100 | 10 | 100 | 100 | 40 | 100 |
| Sugar | Sucrose | kg | 100 | 100 | 100 | 100 | 100 | 100 |
| Sodium chloride | Sodium chloride | kg | 30 | 30 | 30 | 30 | 30 | 30 |
| pH adjuster | Sodium citrate | kg | | | + | + | + | + |
| Remainder | Water | kg | Remainder | Remainder | Remainder | Remainder | Remainder | Remainder |
| Total | | kg | 1000 | 1000 | 1000 | 1000 | 1000 | 1000 |
| Mass percentage of all 100-mesh-on ingredients | | % by mass | 17.0 | 35.0 | 35.0 | 35.0 | 35.0 | 35.0 |
| Mass percentage of 100-mesh-on swollen particles of crushed plant material | | % by mass | 2.0 | 20.0 | 20.0 | 20.0 | 20.0 | 20.0 |
| Mass percentage of 9-mesh-pass/100-mesh-on swollen particles of crushed plant material | | % by mass | 2.0 | 20.0 | 20.0 | 20.0 | 20.0 | 20.0 |
| Mass percentage of 4-mesh-pass/100-mesh-on swollen particles of cold water swellable starch | | % by mass | 15.0 | 15.0 | 15.0 | 15.0 | 15.0 | 15.0 |
| Properties | | | | | | | | |
| pH(20°C) | | - | 2.80 | 4.10 | 4.30 | 3.85 | 4.20 | 3.80 |
| Acetic acid concentration | | % by mass | 1.50 | 0.15 | 1.50 | 1.50 | 0.60 | 1.50 |
| Dissociated acetic acid concentration | | % by mass | 0.016 | 0.027 | 0.386 | 0.164 | 0.130 | 0.148 |
| Viscosity (20°C) | | mPa·s | 3479 | 3857 | 3857 | 3857 | 3857 | 3857 |
| Sensory Evaluation | | | | | | | | |
| Foam breaking property after shaking | | Panelist 1 | A | A | C | B | A | B |
| | | Panelist 2 | A | A | C | C | A | A |
| | | Panelist 3 | A | A | C | C | A | A |
| | | Panelist 4 | A | A | C | C | A | A |
| | | Panelist 5 | A | A | B | B | A | A |
| Color tone after shaking | | Panelist 1 | A | A | C | B | A | B |
| | | Panelist 2 | A | A | C | C | A | A |
| | | Panelist 3 | A | A | C | C | A | A |
| | | Panelist 4 | A | A | C | C | A | A |
| | | Panelist 5 | A | A | B | B | A | A |

FIG. 3

Table 4-1

| Composition | | | No.18 | No.19 | No.20 | No.21 | No.22 |
|---|---|---|---|---|---|---|---|
| Crushed plant material | Tomato paste | kg | 30 | | | | |
| | Cucumber based | kg | 20 | | | 20 | |
| | Minced Onion | kg | 50 | 30 | | | |
| | Apple puree | kg | | 10 | | | |
| | Concentrated apple juice (turbid) | kg | | 50 | | | |
| | Garlic paste | kg | | | | 1 | |
| | Ginger puree | kg | | | | | 30 |
| | Onion puree | kg | | | 50 | 45 | 40 |
| | Lemon puree | kg | | | | | |
| | Tangerine paste | kg | | | | | |
| | Orange puree | kg | | | | | |
| | Carrot paste | kg | | | | 15 | |
| | Grated radish | kg | | | | | |
| | Onion chips | kg | | | 10 | 5 | 10 |
| | Tomato chips | kg | 1.5 | | | | |
| | Garlic chips | kg | | | 2 | | |
| | Red bell pepper chips | kg | 1 | | | 2 | |
| | Orange peel | kg | | | | | |
| | Mass percentage | % by mass | 10.25 | 9 | 6.3 | 8.7 | 8 |
| Gum | Xanthane gum | kg | 2 | | 3 | 3 | 2 |
| | Tamarind seed gum | kg | 1 | 1 | | | |
| | Guar gum | kg | | 1 | | | |
| | Soluble starch | kg | | | | | |
| | Mass percentage | % by mass | 0.30 | 0.20 | 0.30 | 0.30 | 0.20 |
| Cold water swellable starch | | kg | 5 | 15 | 1 | 4 | 15 |
| | Mass percentage | % by mass | 0.5 | 1.5 | 0.1 | 0.4 | 1.5 |
| Total mass percentage of thickeners (gum + cold water swellable starch) | | % by mass | 0.8 | 1.7 | 0.4 | 0.7 | 1.7 |
| Mass ratio of (gum)/ (Cold water swellable starch) | | - | 0.60 | 0.13 | 3.00 | 0.75 | 0.13 |
| Vinegar | Vinegar (acidity 15%) | kg | 30 | 20 | | 75 | 30 |
| | Apple vinegar (acidity 5%) | kg | 30 | 60 | 200 | | 30 |
| | Grain vinegar (acidity 4.5%) | kg | | | | | 30 |
| | Balsamic vinegar (acidity 6%) | kg | 5 | | | | |
| | Black vinegar (acidity 7%) | kg | | | | | |
| Sugar | Sucrose | kg | 15 | 50 | 100 | 30 | 22 |
| | Sucralose | kg | 0.1 | 0.1 | | 0.054 | 0.1 |
| Sodium chloride | Sodium chloride | kg | 40 | 40 | 40 | 40 | 40 |
| Processed egg yolk | Processed egg yolk | kg | | | | | |
| pH adjuster | Sodium citrate | kg | | | | | |
| Spices | Pepper | kg | 0.5 | 0.15 | 0.5 | 0.05 | 0.1 |
| | Chili pepper extract | kg | 0.05 | | | | |
| | Ginger oil | kg | | | | | 0.05 |
| Remainder | Water | kg | Remainder | Remainder | Remainder | Remainder | Remainder |
| Total | | kg | 1000 | 1000 | 1000 | 1000 | 1000 |

FIG. 4A

Table 4-2

| | | | No.23 | No.24 | No.25 | No.26 | No.27 |
|---|---|---|---|---|---|---|---|
| Composition | | | | | | | |
| Crushed plant material | Tomato paste | kg | | | | | |
| | Cucumber based | kg | 2 | | | | |
| | Minced Onion | kg | | | | | |
| | Apple puree | kg | | | | | |
| | Concentrated apple juice (turbid) | kg | | | | | |
| | Garlic paste | kg | | | | | 2 |
| | Ginger puree | kg | | | | | |
| | Onion puree | kg | 40 | | 90 | 70 | |
| | Lemon puree | kg | | 10 | | | |
| | Tangerine paste | kg | | 10 | | | |
| | Orange puree | kg | | 30 | | | |
| | Carrot paste | kg | | | | | |
| | Grated radish | kg | | | | | 60 |
| | Onion chips | kg | | | | | |
| | Tomato chips | kg | | | | | |
| | Garlic chips | kg | | | | | |
| | Red bell pepper chips | kg | 0.5 | | | | |
| | Orange peel | kg | | 2 | | | |
| | Mass percentage | % by mass | 4.25 | 5.2 | 9 | 7 | 6.2 |
| Gum | Xanthane gum | kg | 9 | 3 | 0.50 | 2.5 | 1 |
| | Tamarind seed gum | kg | | | | | |
| | Guar gum | kg | | | | | |
| | Soluble starch | kg | | | 15 | | |
| | Mass percentage | % by mass | 0.90 | 0.30 | 1.55 | 0.25 | 0.10 |
| Cold water swellable starch | | kg | 4 | 16 | 5 | 2.5 | 20 |
| | Mass percentage | % by mass | 0.4 | 1.6 | 0.5 | 0.25 | 2 |
| Total mass percentage of thickeners (gum + cold water swellable starch) | | % by mass | 1.3 | 1.9 | 2.05 | 0.5 | 2.1 |
| Mass ratio of (gum)/ (Cold water swellable starch) | | - | 2.25 | 0.19 | 3.10 | 1.00 | 0.05 |
| Vinegar | Vinegar (acidity 15%) | kg | 50 | 20 | 55 | | 50 |
| | Apple vinegar (acidity 5%) | kg | | 60 | 60 | | |
| | Grain vinegar (acidity 4.5%) | kg | | | | | |
| | Balsamic vinegar (acidity 6%) | kg | | | | | |
| | Black vinegar (acidity 7%) | kg | | | | 150 | |
| Sugar | Sucrose | kg | 60 | 33 | 100 | 75 | 10 |
| | Sucralose | kg | | 0.1 | | 0.1 | 0.15 |
| Sodium chloride | Sodium chloride | kg | 25 | 35 | 40 | 43 | 40 |
| Processed egg yolk | Processed egg yolk | kg | 55 | | | | |
| pH adjuster | Sodium citrate | kg | | | | | |
| Spices | Pepper | kg | 1.5 | | 0.6 | 0.1 | 1 |
| | Chili pepper extract | kg | | | | | |
| | Ginger oil | kg | | | | | |
| Remainder | Water | kg | Remainder | Remainder | Remainder | Remainder | Remainder |
| Total | | kg | 1000 | 1000 | 1000 | 1000 | 1000 |

FIG. 4B

Table 4-3

| | | No.18 | No.19 | No.20 | No.21 | No.22 |
|---|---|---|---|---|---|---|
| Mass percentage of all 100-mesh-on ingredients | % by mass | 39.1 | 41.5 | 20.1 | 26.5 | 43.5 |
| Mass percentage of 100-mesh-on swollen particles of crushed plant material | % by mass | 31.6 | 19.0 | 18.6 | 20.5 | 21.0 |
| Mass percentage of 9-mesh-pass/100-mesh-on swollen particles of crushed plant material | % by mass | 20.0 | 13.0 | 12.6 | 15.4 | 16.0 |
| Mass percentage of 4-mesh-pass/100-mesh-on swollen particles of cold water swellable starch | % by mass | 7.5 | 22.5 | 1.5 | 6.0 | 22.5 |
| Properties | | | | | | |
| pH(20°C) | - | 4.00 | 3.45 | 3.70 | 3.70 | 3.00 |
| Acetic acid concentration | % by mass | 0.63 | 0.60 | 1.00 | 1.13 | 0.74 |
| Dissociated acetic acid concentration | % by mass | 0.093 | 0.028 | 0.080 | 0.090 | 0.013 |
| Viscosity (20°C) | mPa·s | 1044 | 1032 | 1120 | 1280 | 1240 |
| Sensory Evaluation | | | | | | |
| Foam breaking property after shaking | Panelist 1 | A | A | A | A | A |
| | Panelist 2 | A | A | A | A | A |
| | Panelist 3 | A | A | A | A | A |
| | Panelist 4 | A | A | A | A | A |
| | Panelist 5 | A | A | A | A | A |
| Color tone after shaking | Panelist 1 | A | A | A | A | A |
| | Panelist 2 | A | A | A | A | A |
| | Panelist 3 | A | A | A | A | A |
| | Panelist 4 | A | A | A | A | A |
| | Panelist 5 | A | A | A | A | A |

FIG. 4C

Table 4-4

|  |  | No.22 | No.23 | No.24 | No.25 | No.26 | No.27 |
|---|---|---|---|---|---|---|---|
| Mass percentage of all 100-mesh-on ingredients | % by mass | 43.5 | 14.7 | 35.4 | 25.5 | 17.8 | 72.4 |
| Mass percentage of 100-mesh-on swollen particles of crushed plant material | % by mass | 21.0 | 8.7 | 11.4 | 18.0 | 14.0 | 42.4 |
| Mass percentage of 9-mesh-pass/100-mesh-on swollen particles of crushed plant material | % by mass | 16.0 | 8.3 | 10.4 | 18.0 | 14.0 | 12.4 |
| Mass percentage of 4-mesh-pass/100-mesh-on swollen particles of cold water swellable starch | % by mass | 22.5 | 6.0 | 24.0 | 7.5 | 3.8 | 30.0 |
| Properties |  |  |  |  |  |  |  |
| pH(20°C) | - | 3.00 | 4.10 | 3.60 | 3.70 | 3.27 | 3.84 |
| Acetic acid concentration | % by mass | 0.74 | 0.75 | 0.60 | 1.13 | 1.05 | 0.75 |
| Dissociated acetic acid concentration | % by mass | 0.013 | 0.135 | 0.039 | 0.090 | 0.033 | 0.080 |
| Viscosity (20°C) | mPa·s | 1240 | 5112 | 1762 | 1940 | 1240 | 600 |
| Sensory Evaluation |  |  |  |  |  |  |  |
| Foam breaking property after shaking | Panelist 1 | A | A | A | A | A | A |
|  | Panelist 2 | A | A | A | A | A | A |
|  | Panelist 3 | A | A | A | A | A | A |
|  | Panelist 4 | A | A | A | A | A | A |
|  | Panelist 5 | A | B | A | A | A | A |
| Color tone after shaking | Panelist 1 | A | A | A | A | A | A |
|  | Panelist 2 | A | A | A | A | A | A |
|  | Panelist 3 | A | A | A | A | A | A |
|  | Panelist 4 | A | A | A | A | A | A |
|  | Panelist 5 | A | B | A | A | A | A |

FIG. 4D

ACIDIC LIQUID SEASONING CONTAINING PLANT-DERIVED CRUSHED MATERIALS

TECHNICAL FIELD

The present invention relates to an acidic liquid seasoning containing a crushed plant material with improved foam-breaking property after mixing by stirring or shaking, as well as a process of producing the same.

BACKGROUND ART

Liquid seasonings of various tastes and forms have long been used for seasoning cooked foods such as salads and fried foods. Among them are seasonings containing crushed plant material in the form of pieces, such as grated vegetables or mashed fruits, or in the form of puree or paste. Such seasonings containing crushed plant material have been developed in response to consumers' desire to enjoy changing the taste of a food to be seasoned easily, without the need of preparing crushed plant material separately and mixing it into seasoning by themselves.

An important requirement for such a liquid seasoning containing crushed plant material is that it does not drip off from a food to be seasoned, such as salads and fried foods, but remains thereon such that the taste of the seasoning is distributed evenly over the food even when used in only a small amount. Another important requirement is that the plant flavor and texture of crushed plant material contained in such a liquid seasoning are to be felt palatable. A conventional method for preventing a liquid seasoning from dripping off from a food to be seasoned is to thicken the liquid phase of the seasoning with a thickener such as gum. A conventional method for rendering the plant flavor and texture of the crushed plant material contained in a liquid seasoning to be more palatable is to adjust the size (particle diameter) of the crushed plant material and its content in the liquid seasoning.

These methods are disclosed in, e.g., JP-H03-228663A (Patent Document 1), which describes a foamed liquid seasoning containing starch and xanthane gum, and JP2017-123817A (Patent Document 2), which describes a liquid seasoning containing vegetable pieces and sesame seeds (crushed plant material) with adjusted sizes and in adjusted amounts.

However, the former method involves a problem in that, when a thickening agent such as gum is used for increasing the viscosity of a liquid seasoning, the seasoned generates air bubbles vigorously when mixed by stirring, and retains the bubbles in the seasoned liquid for a long time even if left to stand after the stir-mixing. As a result, the seasoning liquid tends to leak from the tank or the container during the stir-mixing or packaging step of the production process, which leads to a decline in productivity.

The latter method involves the following problems: when a seasoning containing crushed plant material is poured over a food to be seasoned, such as salad, a consumer usually holds the container of the seasoning by hand and shakes it up and down and from left and right before using it, in order to mix the crushed plant material in the seasoning liquid uniformly. However, shaking the seasoning liquid causes air bubbles, which remain in the seasoning liquid and render it whitish, fading the color tone of the seasoning liquid. The bubbles also express strong lumpy texture and thereby mask the original flavor of the crushed plant material in the mouth, making it difficult for a consumer to feel the favorable texture of the crushed plant material.

CITATION LIST

Patent Documents

Patent Document 1: JP-H03-228663A
Patent Document 2: JP2017-123817A

SUMMARY OF INVENTION

Technical Problem

A problem to be solved by the present invention is to provide an acidic liquid seasoning containing crushed plant material with improved foam-breaking property after mixing via stirring or shaking.

Solution to Problem

The present inventors conducted intensive studies to solve the above problems and, as a result, have found that the foam-breaking property of an acidic liquid seasoning containing a crushed plant material can be improved by incorporating a gum and a cold water swellable starch therein and adjusting the viscosity and dissociation thereof to within their respective predetermined ranges, thereby arriving at the present invention.

Some aspects of the present invention relate to the following:

[1] An acidic liquid seasoning comprising: a crushed plant material; a gum; a cold water swellable starch; and a vinegar, wherein the acidic liquid seasoning has (A) a viscosity at 20° C. of between 500 mPa·s and 10000 mPa·s, and (B) a dissociated acetic acid concentration of 0.16% by mass or less.

[2] The acidic liquid seasoning according to [1], wherein the viscosity at 20° C. is 600 mPa·s or more.

[3] The acidic liquid seasoning according to [2], wherein the viscosity at 20° C. is 700 mPa·s or more.

[4] The acidic liquid seasoning according to any of [1] to [3], wherein the viscosity at 20° C. is 9500 mPa·s or less.

[5] The acidic liquid seasoning according to [4], wherein the viscosity at 20° C. is 9000 mPa·s or less.

[6] The acidic liquid seasoning according to any of [1] to [5], wherein the dissociated acetic acid concentration is 0.15% by mass or less.

[7] The acidic liquid seasoning according to [6], wherein the dissociated acetic acid concentration is 0.13% by mass or less.

[8] The acidic liquid seasoning according to any of [1] to [7], wherein the dissociated acetic acid concentration is 0.002% by mass or more.

[9] The acidic liquid seasoning according to [8], wherein the dissociated acetic acid concentration is 0.005% by mass or more.

[10] The acidic liquid seasoning according to [9], wherein the dissociated acetic acid concentration is 0.01% by mass or more.

[11] The acidic liquid seasoning according to any of [1] to [10], wherein the percentage of particles of the cold water swellable starch which pass through a 4-mesh sieve and remain on a 100-mesh sieve is between 0.2% and 60% by mass relative to the total mass of the acidic liquid seasoning.

[12] The acidic liquid seasoning according to [11], wherein the percentage of particles of the cold water swellable starch which pass through a 4-mesh sieve and remain on a 100-mesh sieve is 1% by mass or more relative to the total mass of the acidic liquid seasoning.

[13] The acidic liquid seasoning according to any of [1] to [12], wherein the percentage of particles of the cold water swellable starch which pass through a 4-mesh sieve and remain on a 100-mesh sieve is 50% by mass or less relative to the total mass of the acidic liquid seasoning.

[14] The acidic liquid seasoning according to [13], wherein the percentage of particles of the cold water swellable starch which pass through a 4-mesh sieve and remain on a 100-mesh sieve is 40% by mass or less relative to the total mass of the acidic liquid seasoning.

[15] The acidic liquid seasoning according to any of [1] to [14], wherein the percentage of swollen particles of the crushed plant material which remain on a 100-mesh sieve is 0.2% by mass or more relative to the total mass of the acidic liquid seasoning.

[16] The acidic liquid seasoning according to [15], wherein the percentage of swollen particles of the crushed plant material which remain on a 100-mesh sieve is 0.5% by mass or more relative to the total mass of the acidic liquid seasoning.

[17] The acidic liquid seasoning according to any of [1] to [16], wherein the percentage of swollen particles of the crushed plant material which remain on a 100-mesh sieve is 60% by mass or less relative to the total mass of the acidic liquid seasoning.

[18] The acidic liquid seasoning according to [17], wherein the percentage of swollen particles of the crushed plant material which remain on a 100-mesh sieve is 50% by mass or less relative to the total mass of the acidic liquid seasoning.

[19] The acidic liquid seasoning according to any of [1] to [18], wherein the percentage of swollen particles of the crushed plant material which pass through a 9-mesh sieve and remain on a 100-mesh sieve is 0.2% by mass or more relative to the total mass of the acidic liquid seasoning.

[20] The acidic liquid seasoning according to [19], wherein the percentage of swollen particles of the crushed plant material which pass through a 9-mesh sieve and remain on a 100-mesh sieve is 0.5% by mass or more relative to the total mass of the acidic liquid seasoning.

[21] The acidic liquid seasoning according to any of [1] to [20], wherein the percentage of swollen particles of the crushed plant material which pass through a 9-mesh sieve and remain on a 100-mesh sieve is 50% by mass or less relative to the total mass of the acidic liquid seasoning.

[22] The acidic liquid seasoning according to [21], wherein the percentage of swollen particles of the crushed plant material which pass through a 9-mesh sieve and remain on a 100-mesh sieve is 40% by mass or less relative to the total mass of the acidic liquid seasoning.

[23] The acidic liquid seasoning according to any of [1] to [22], wherein the percentage of all particles excluding the swollen particles of cold water swellable starch which remain on a 100-mesh sieve is 0.2% by mass or more relative to the total mass of the acidic liquid seasoning.

[24] The acidic liquid seasoning according to [23], wherein the percentage of all particles excluding the swollen particles of cold water swellable starch which remain on a 100-mesh sieve is 0.5% by mass or more relative to the total mass of the acidic liquid seasoning.

[25] The acidic liquid seasoning according to any of [1] to [24], wherein the percentage of all particles excluding the swollen particles of cold water swellable starch which remain on a 100-mesh sieve is 60% by mass or more relative to the total mass of the acidic liquid seasoning.

[26] The acidic liquid seasoning according to [25], wherein the percentage of all particles excluding the swollen particles of cold water swellable starch which remain on a 100-mesh sieve is 50% by mass or more relative to the total mass of the acidic liquid seasoning.

[27] The acidic liquid seasoning according to any of [1] to [26], wherein the percentage of all particles excluding the swollen particles of cold water swellable starch which pass through a 9-mesh sieve and remain on a 100-mesh sieve is 0.2% by mass or more relative to the total mass of the acidic liquid seasoning.

[28] The acidic liquid seasoning according to [27], wherein the percentage of all particles excluding the swollen particles of cold water swellable starch which pass through a 9-mesh sieve and remain on a 100-mesh sieve is 0.5% by mass or more relative to the total mass of the acidic liquid seasoning.

[29] The acidic liquid seasoning according to any of [1] to [28], wherein the percentage of all particles excluding the swollen particles of cold water swellable starch which pass through a 9-mesh sieve and remain on a 100-mesh sieve is 50% by mass or less relative to the total mass of the acidic liquid seasoning.

[30] The acidic liquid seasoning according to [29], wherein the percentage of all particles excluding the swollen particles of cold water swellable starch which pass through a 9-mesh sieve and remain on a 100-mesh sieve is 40% by mass or less relative to the total mass of the acidic liquid seasoning.

[31] The acidic liquid seasoning according to any of [1] to [30], wherein the crushed plant material is paste or puree of plant-derived foodstuff.

[32] The acidic liquid seasoning according to any of [1] to [31], wherein the crushed plant material is derived from one or more selected from the group consisting of tomato, cucumber, apple, ginger, onion, orange, mandarin orange (citrus unshiu), lemon, garlic, carrot, paprika, red bell pepper, and daikon (Japanese radish).

[33] The acidic liquid seasoning according to any of [1] to [32], wherein the gum is one or more selected from xanthane gum, guar gum, locust bean gum, tamarind seed gum, and starch.

[34] The acidic liquid seasoning according to any of [1] to [33], wherein the pH is 2.2 or more.

[35] The acidic liquid seasoning according to [34], wherein the pH is 2.5 or more.

[36] The acidic liquid seasoning according to [35], wherein the pH is 2.8 or more.

[37] The acidic liquid seasoning according to any of [1] to [36], wherein the pH is 4.8 or less.

[38] The acidic liquid seasoning according to [37], wherein the pH is 4.6 or less.

[39] The acidic liquid seasoning according to [38], wherein the pH is 4.4 or less.

[40] The acidic liquid seasoning according to any of [1] to [39], wherein the acetic acid concentration is 0.1% by mass or more.

[41] The acidic liquid seasoning according to [40], wherein the acetic acid concentration is 0.15% by mass or more.

[42] The acidic liquid seasoning according to any of [1] to [41], wherein the acetic acid concentration is 15% by mass or less.

[43] The acidic liquid seasoning according to [42], wherein the acetic acid concentration is 10% by mass or less.

[44] The acidic liquid seasoning according to any of [1] to [43], wherein the dry mass percentage of the gum is 0.05% by mass or more relative to the total mass of the liquid seasoning.
[45] The acidic liquid seasoning according to [44], wherein the dry mass percentage of the gum is 0.1% by mass or more relative to the total mass of the liquid seasoning.
[46] The acidic liquid seasoning according to any of [1] to [45], wherein the dry mass percentage of the gum is 5% by mass or less relative to the total mass of the liquid seasoning.
[47] The acidic liquid seasoning according to [46], wherein the dry mass percentage of the gum relative to the total mass of the liquid seasoning is 3% by mass or less.
[48] The acidic liquid seasoning according to any of [1] to [47], wherein the dry mass percentage of the cold water swellable starch relative to the total mass of the liquid seasoning 0.05% by mass or more.
[49] The acidic liquid seasoning according to [48], wherein the dry mass percentage of the cold water swellable starch relative to the total mass of the liquid seasoning 0.1% by mass or more.
[50] The acidic liquid seasoning according to any of [1] to [49], wherein the dry mass percentage of the cold water swellable starch relative to the total mass of the liquid seasoning 5% by mass or less.
[51] The acidic liquid seasoning according to [50], wherein the dry mass percentage of the cold water swellable starch relative to the total mass of the liquid seasoning 3% by mass or less.
[52] The acidic liquid seasoning according to any of [1] to [51], wherein the total dry mass percentage of the gum and the cold water swellable starch is 0.2% by mass or more relative to the total mass of the liquid seasoning.
[53] The acidic liquid seasoning according to [52], wherein the total dry mass percentage of the gum and the cold water swellable starch is 0.3% by mass or more relative to the total mass of the liquid seasoning.
[54] The acidic liquid seasoning according to any of [1] to [53], wherein the total dry mass percentage of the gum and the cold water swellable starch is 10% by mass or less relative to the total mass of the liquid seasoning.
[55] The acidic liquid seasoning according to [54], wherein the total dry mass percentage of the gum and the cold water swellable starch is 7% by mass or less relative to the total mass of the liquid seasoning.
[56] The acidic liquid seasoning according to any of [1] to [55], wherein the dry mass ratio of the gum to the cold water swellable starch is 0.04 or more.
[57] The acidic liquid seasoning according to [56], wherein the dry mass ratio of the gum to the cold water swellable starch is.05 or more.
[58] The acidic liquid seasoning according to any of [1] to [57], wherein the dry mass ratio of the gum to the cold water swellable starch is 5 or less.
[59] The acidic liquid seasoning according to [58], wherein the dry mass ratio of the gum to the cold water swellable starch is 4 or less.
[60] The acidic liquid seasoning according to any of [1] to [59], wherein the percentage of all ingredients which remain on a 100-mesh sieve is 1% by mass or more relative to the total mass of the acidic liquid seasoning.
[61] The acidic liquid seasoning according to [60], wherein the percentage of all ingredients which remain on a 100-mesh sieve is 2% by mass or more relative to the total mass of the acidic liquid seasoning.
[62] The acidic liquid seasoning according to any of [1] to [61], wherein the percentage of all ingredients which remain on a 100-mesh sieve is 80% by mass or less relative to the total mass of the acidic liquid seasoning.
[63] The acidic liquid seasoning according to [62], wherein the percentage of all ingredients which remain on a 100-mesh sieve is 75% by mass or less relative to the total mass of the acidic liquid seasoning.
[64] A process for producing an acidic liquid seasoning, comprising: mixing a crushed plant material, a gum, a cold water swellable starch, and a vinegar, optionally with one or more other ingredients, such that the resultant mixture satisfies the requirements for the acidic liquid seasoning according to any of [1] to [63]. [65] The process according to [64], wherein the mixing is carried out at a temperature of 35° C. or more.
[66] The process according to [65], wherein the mixing is carried out at a temperature of 40° C. or more.
[67] The process according to [65] or [66], wherein the mixing is carried out at a temperature of 100° C. or less.
[68] The process according to [67], wherein the mixing is carried out at a temperature of 90° C. or less.
[69] The process according to [68], wherein the mixing is carried out at a temperature of 85° C. or less.
[70] A method for improving the foam-breaking property of an acidic liquid seasoning containing a crushed plant material after mixing by stirring or shaking, comprising: mixing a crushed plant material, a gum, a cold water swellable starch, and a vinegar, optionally with one or more other ingredients, such that the resultant mixture satisfies the requirements for the acidic liquid seasoning according to any of [1] to [63].
[71] A method for improving an acidic liquid seasoning containing a crushed plant material by modifying at least one of plant color tone, plant flavor, and plant texture originating from the crushed plant material, comprising mixing a crushed plant material, a gum, a cold water swellable starch, and a vinegar, optionally with one or more other ingredients, such that the resultant mixture satisfies the requirements for the acidic liquid seasoning according to any of [1] to [63].

Effects

Some aspects of the present invention provide an acidic liquid seasoning containing crushed plant material which is excellent in defoaming property after mixing via stirring or shaking.

BRIEF DESCRIPTION OF THE DRAWINGS

FIG. 1 is Table 1.
FIG. 2 is Table 2.
FIG. 3 is Table 3.
FIG. 4A is Table 4-1.
FIG. 4B is Table 4-2.
FIG. 4C is Table 4-3.
FIG. 4D is Table 4-4.

EMBODIMENTS

The present invention will now be described in detail with reference to specific embodiments. However, the present invention is not limited to the following embodiments and can be implemented in any form without departing from the spirit of the present invention.
<Liquid Seasoning>
The first aspect of the present invention provides an acidic liquid seasoning containing: a crushed plant material; a gum;

a cold water swellable starch; and a vinegar, wherein the viscosity at 20° C. and the dissociated acetic acid concentration of the acidic liquid seasoning are within their respective predetermined ranges (hereinafter referred to as "the liquid seasoning of the present invention").

The present inventors conducted intensive studies in view of the above-mentioned problems and, as a result, have arrived at the idea of modifying an acidic liquid seasoning by incorporating a gum and a cold water swellable starch therein and also adjusting the viscosity and the dissociation thereof to within their respective predetermined ranges. The present inventors have also found that the resultant liquid seasoning is characterized in that generation of bubbles is suppressed when it is mixed by stirring or shaking, and that retention of generated air bubbles is reduced when it is left to stand after mixing, whereby the foam-breaking property thereof is improved. The present inventors have further found that the suppressed generation and reduced retention of air bubbles serve to reveal the preferable color tone of the crushed plant material, and also to enhance the preferable flavor, texture and feel of the crushed plant material in the mouth, by avoiding them from being masked by air bubbles. The present inventors have also found that adjusting the dissociated acetic acid concentration of the liquid seasoning helps enhance the preferable flavor, texture and feel of the crushed plant material, thereby completing the present invention.

The term "liquid seasoning" herein refers to a seasoning having liquidity used for enhancing the deliciousness of cooked foods or food materials. Examples of liquid seasonings include dressings, which are used for seasoning vegetables, meats, or fishery products, as well as bastes, sauces, soups, and citrus vinegars (ponzu).

<Crushed Plant Material>

The liquid seasoning of the present invention contains a crushed plant material. Examples of "crushed plant materials" herein include juices obtained by processing (e.g., cutting and crushing) vegetables and fruits, as well as purees, pastes, etc. Other examples include concentrates of these products via concentration process (e.g., heating), and dried vegetables prepared via hot air drying, freeze drying, vacuum heating, microwave drying, etc.

Examples of vegetables include, although not limited to: fruit vegetables such as tomato, bell pepper, paprika, cucumber, eggplant, and red bell pepper; root vegetables such as onion, ginger, garlic, radish, and carrot; leaf vegetables such as cabbage, lettuce, spinach, Chinese cabbage, celery, Japanese mustard spinach, bok choy, moroheiya, kale, perilla, chive, and parsley; stem vegetables such as garlic, asparagus, and bamboo shoots; flower vegetables such as broccoli and cauliflower; mushrooms and other vegetable derivatives. Preferred among them are tomato, cucumber, ginger, onion, garlic, carrot, paprika, red bell pepper, and daikon (Japanese radish). These vegetables may be used either singly or in any combination of two or more at any ratios.

Examples of fruits include, although not limited to: fruits of apples, peaches, grapes, acerola, blueberries, pears, oranges, lemons, yuzu, sudachi, lime, mandarin orange (citrus unshiu), grapefruit, strawberries, bananas, melons, kiwis, pineapples, cassis, apricots, guava, plums, mangoes, papayas, litchi, etc., as well as their derivatives. These fruits may be used either singly or in any combination of two or more at any ratios. The liquid seasoning of the present invention may contain two or more kinds of crushed plant materials prepared from two or more of these vegetables and/or fruits in any combination at any ratios.

According to the present invention, since generation and retention of air bubbles are suppressed, the color tone of the crushed plant material is prevented from being whitish due to air bubbles, whereby the resultant liquid seasoning can express the bright color tone of the crushed plant material. This effect of the present invention can prominently be exerted especially when the liquid seasoning of the present invention contains a crushed plant material having a bright color, such as a crushed plant material having a beautiful color, such as tomato, paprika, cucumber, red pepper, carrot, and orange.

The liquid seasoning of the present invention may optionally contain, in addition to the crushed plant material, solid pieces of plant material as well as solid pieces and/or crushed particles of non-plant material. Examples of solid pieces of plant materials include onions, cucumbers, pickles, and carrots. Examples of solid pieces and/or crushed particles of non-plant materials include solid pieces and/or crushed particles of animal foodstuff, such as meat and fishery products.

The content of the crushed plant material in the liquid seasoning of the present invention may preferably be within a predetermined range. Specifically, the percentage of the crushed plant material relative to the total mass of the liquid seasoning may preferably be 0.1% by mass or more, particularly 0.3% by mass or more. If the content of the crushed plant material falls short of this lower limit, the color tone and flavor of the crushed plant material may hardly be felt. The percentage of the crushed plant material relative to the total mass of the liquid seasoning may also preferably be 30% by mass or less, particularly 20% by mass or less. If the content of the crushed plant material exceeds this upper limit, the flavor of the crushed plant material may be felt so strongly that the present invention's effect of restoring or retaining the flavor of the crushed plant material may hardly be felt.

The crushed plant material to be used in the liquid seasoning of the present invention may contain solid pieces having relatively large sizes (e.g., vegetable pieces and fruit pulp pieces), but may preferably contain crushed particles having relatively small sizes within a predetermined range in a certain amount or more. Specifically, the content of the particles of crushed plant material which do not pass through a 100-mesh test sieve complying with the JIS standard (100-mesh-on) may preferably be 80% by mass or more, particularly 90% by mass or more, relative to the total mass of the crushed plant material (in this context, a sieve having a mesh size of, e.g., "No. 100" may be referred to as "100-mesh sieve", and passing and not passing through a mesh of a specific size may be referred to as "mesh pass" and "mesh on," respectively). In general, a desirable flavor originating from a plant material may likely be lost during the process of crushing, mashing, or concentrating the plant material. However, if large-sized pieces of the plant material exist in a certain amount or more, the flavor originating from the plant material is likely to be expressed regardless of whether the present invention is applied, whereby the aforementioned effects of the present invention may not be significant. On the other hand, when the crushed plant material contains almost no such large-sized pieces, the flavor and texture originating from the plant material are likely to be lost through the processing steps such as crushing and condensing. When such a crushed plant material containing almost no large-sized particles of the plant material is used, then the aforementioned effects of the present invention are likely to be remarkably achieved.

For the same reason, the liquid seasoning of the present invention may preferably contain swollen particles of the crushed plant material having predetermined sizes in a certain amount. Specifically, the percentage of the swollen particles of crushed plant material which do not pass through a 100-mesh sieve (which remain on a 100-mesh sieve) relative to the total mass of the liquid seasoning may preferably be 0.2% by mass or more, particularly 0.5% by mass or more, and may preferably be 60% by mass or less, particularly 50% by mass or less. If this parameter falls short of the above range, the color tone and flavor of the crushed plant material may not be felt sufficiently. On the other hand, if this parameter exceeds the above range, the flavor of the crushed plant material may be felt so strongly as to impair the overall flavor of the liquid seasoning.

The percentage of the swollen particles of crushed plant material relative to the total mass of the liquid seasoning of the present invention can be adjusted, e.g., by impregnating the crushed plant material sufficiently with water, placing the water-swollen crushed plant material on a 100-mesh sieve to drain water, and weighing the mass of the particles remaining on the sieve to determine the percentage of the 100-mesh-on particles. Alternatively, the percentage of the swollen particles of crushed plant material relative to the total mass of an existing liquid seasoning product can be determined by, e.g., diluting the seasoning product with water as appropriate (by about 10 to 20 times), placing the diluted product on a 100-mesh sieve, visually separating the particles of crushed plant material from the particles which remain on the 100-mesh sieve, and weighing the separated particles of crushed plant material.

For the same reason, the liquid seasoning of the present invention may preferably not contain large-sized swollen particles of the crushed plant material in a large amount. Specifically, the percentage of the swollen particles of crushed plant material which pass through a 9-mesh sieve and do not pass through a 100-mesh sieve (i.e., 9-mesh-pass and 100-mesh-on particles) relative to the total mass of the liquid seasoning may preferably be 0.2% by mass or more, particularly 0.5% by mass or more, and preferably be 50% by mass or less, particularly 40% by mass or less. If this parameter falls short of the above range, the color tone and flavor of the crushed plant material may not be felt sufficiently. On the other hand, if this parameter exceeds the above range, the flavor of the crushed plant material may be felt so strongly as to impair the overall flavor of the seasoning.

The percentage of the swollen particles of crushed plant material which pass through a 9-mesh sieve and remain on a 100-mesh sieve relative to the total mass of the liquid seasoning of the present invention can be adjusted, e.g., by impregnating the crushed plant material sufficiently with water, placing the water-swollen crushed plant material on a 9-mesh sieve and a 100-mesh sieve, and weighing the mass of the particles which pass though the 9-mesh sieve and remain on the 100-mesh sieve. Alternatively, the percentage of the swollen particles of crushed plant material which pass through a 9-mesh sieve and remain on a 100-mesh sieve relative to the total mass of an existing liquid seasoning product can be determined by, e.g., diluting the seasoning product with water as appropriate (by about 10 to 20 times), placing the diluted product on a 9-mesh sieve and a 100-mesh sieve, visually identifying and separating the particles of crushed plant material in the particles which pass though the 9-mesh sieve and remain on the 100-mesh sieve, and weighing the separated particles of crushed plant material.

In this regard, depending on the composition of the liquid seasoning product, there may be a case where it is difficult to visually identify and separate the swollen particles of crushed plant material from the particles which remain on a 100-mesh sieve or from the particles which pass through a 9-mesh sieve and remain on a 100-mesh sieve (e.g., a case where the product contains crushed material derived from a non-plant foodstuff, such as meat or dairy product). Nevertheless, it is deemed relatively easy to visually identify and remove the swollen particles of cold water swellable starch from the other ingredients. In such a case, it is preferred to obtain all the ingredients which remain on a 100-mesh sieve or which pass through a 9-mesh sieve and remain on a 100-mesh sieve, to visually identify and the remove swollen particles of cold water swellable starch from the other ingredients (including swollen particles of crushed plant material), and to weigh the remaining ingredients to confirm that the mass of these ingredients satisfies the above range.

Specifically, the mass percentage of the ingredients excluding the swollen particles of cold water swellable starch which remain on a 100-mesh sieve ingredient relative to the total mass of the acidic liquid seasoning may preferably be 0.2% by mass or more, particularly 0.5% by mass or more, and preferably be 60% by mass or less, particularly 50% by mass or less. If this parameter falls short of the above range, the color tone and flavor of the crushed plant material may not be felt sufficiently. On the other hand, if this parameter exceeds the above range, the flavor of the crushed plant material may be felt so strongly as to impair the overall flavor of the seasoning.

Likewise, the mass percentage of the ingredients excluding the swollen particles of cold water swellable starch which pass through a 9-mesh sieve and remain on a 100-mesh sieve, relative to the total mass of the acidic liquid may preferably be 0.2% by mass or more, particularly 0.5% by mass or more, and preferably be 50% by mass or less, particularly 40% by mass or less. If this parameter falls short of the above range, the color tone and flavor of the crushed plant material may not be felt sufficiently. On the other hand, if this parameter exceeds the above range, the flavor of the crushed plant material may be felt so strongly as to impair the overall flavor of the seasoning.

<Gum>

The liquid seasoning of the present invention contains a gun as a thickener. Examples of "gums" used herein include xanthane gum, guar gum, gellan gum, locust bean gum, arabic gum, tamarind seed gum, tara gum, tragacanth gum, and starch (other than "cold water swellable starch" as defined below, including processed starch). Preferred examples of gum include xanthane gum, tamarind seed gum, and guar gum, of which xanthane gum is especially preferred. Gum may be used either singly or in any combination of two or more at any ratios.

The mass percentage of the gum in a dried state relative to the total mass of the liquid seasoning of the present invention may preferably be, although not limited to, 0.05% by mass or more, particularly 0.1% by mass or more, and preferably be 5% by mass or less, particularly 3% by mass or less. If this parameter falls short of the above range, the viscosity of the liquid seasoning may not be sufficient to remain on a food to be seasoned without dripping off. On the other hand, if this parameter exceeds the above range, the foam breaking property of the liquid seasoning may be deteriorated, and the flavor and the texture of the crushed plant material may not be felt sufficiently.

<Cold Water Swellable Starch>

The liquid seasoning of the present invention contains a cold water swellable starch as a thickener. The "cold water swellable starch" herein refers to a starch which absorbs cold water at 25° C. and swells to such an extent that its mass becomes two times or more. Using a cold water swellable starch as a thickener in combination with a gum as mentioned above, as well as adjusting the viscosity and the dissociation acetic acid constant of the liquid seasoning as explained below, serves to yield a liquid seasoning which has a viscosity but also is excellent in the foam breaking property. Examples of cold water swellable starches include crosslinked starches, such as pregelatinized starch, distarch phosphate, acetylated distarch adipate, acetylated distarch phosphate, acetylated oxidized starch, starch sodium octenylsuccinate, starch acetate, oxidized starch, hydroxypropyl starch, hydroxypropyl distarch phosphate, phosphated distarch phosphate, monostarch phasphate, etc. These cold water swellable starches may be used either singly or in any combination of two or more at any ratios.

More specifically, it is preferred to use a "cold water swellable starch" which includes, when swelled in a 1% by mass aqueous solution, swollen particles which pass through a 4-mesh sieve and remain on a 100-mesh sieve at a percentage of 80% by mass or more, particularly 90% by mass or more, relative to the total mass of the swollen particles of starch. If this parameter falls short of the above range, it may be difficult to obtain the effect of reducing the generation of air bubbles after mixing by stirring or shaking, as well as the effect of reducing the retention of air bubbles in the seasoning liquid. In addition, the plant flavor of the crushed plant material may be masked by air bubbles in the seasoning liquid and may rarely be felt in the mouth. Furthermore, the lumpy texture of air bubbles may be so prominent as to hinder the desirable texture of the crushed plant material.

The mass percentage of the cold water swellable starch in a dried state relative to the total mass of the liquid seasoning of the present invention may preferably be, although not limited to, 0.05% by mass or more, particularly 0.1% by mass or more, and preferably be 5% by mass or less, particularly 3% by mass or less. If this parameter falls short of the above range, the effect of reducing the generation of air bubbles after mixing by stirring or shaking may not be sufficiently obtained. On the other hand, if this parameter exceeds the above range, the flavor and texture of the liquid seasoning may be impaired.

The percentage of the total mass of the gum and the cold water swellable starch in a dried state relative to the liquid seasoning of the present invention may preferably be, although not limited to, 0.2% by mass or more, particularly 0.3% by mass or more, and preferably be 10% by mass or less, particularly 7% by mass or less. If this parameter falls short of the above range, the viscosity of the liquid seasoning may not be sufficient to remain on a food to be seasoned without dripping off. On the other hand, if this parameter exceeds the above range, it may be difficult to obtain the effect of reducing the generation of air bubbles after mixing by stirring or shaking, as well as the effect of reducing the retention of air bubbles in the seasoning liquid. In addition, the plant flavor of the crushed plant material may be masked by air bubbles in the seasoning liquid and may rarely be felt in the mouth. Furthermore, the lumpy texture of air bubbles may be so prominent as to hinder the desirable texture of the crushed plant material.

The percentage of the dry mass of the gum relative to the dry mass of the cold water swellable starch in the liquid seasoning of the present invention may preferably be, although not limited to, 0.04 or more, particularly 0.05 or more, and preferably be 5 or less, particularly 4 or less. If this parameter either falls short of or exceeds the above range, it may be difficult to obtain the effect of reducing the generation of air bubbles after mixing by stirring or shaking.

The liquid seasoning of the present invention may preferably contain swollen particles of cold water swellable starch having predetermined sizes in a certain amount. Specifically, the percentage of the swollen particles of cold water swellable starch which pass through a 4-mesh sieve and do not pass through a 100-mesh sieve (i.e., 4-mesh-pass and 100-mesh-on) relative to the total mass of the liquid seasoning may preferably be 0.5% by mass or more, particularly 1% by mass or more, and preferably be 50% by mass or less, particularly 40% by mass or less. If this parameter falls short of the above range, it may be difficult to obtain the effect of reducing the generation or retention of air bubbles. On the other hand, if this parameter exceeds the above range, the effect of reducing the generation or retention of air bubbles may be so deteriorated as to hinder the plant flavor or texture the crushed plant material originally has.

The mass percentage of the swollen particles of cold water swellable starch which pass through a 4-mesh sieve and remain on a 100-mesh sieve relative to the total mass of the liquid seasoning can be measured, e.g., by diluting the liquid seasoning with water as appropriate (by about 10 to 20 times), placing the diluted seasoning on a 4-mesh sieve and a 100-mesh sieve to select swollen particles which pass through the 4-mesh sieve and do not pass through the 100-mesh sieve, visually identifying and removing other ingredients (e.g., swollen particles of crushed plant material) from swollen particles of cold water swellable starch, and weighing the mass of the remaining swollen particles of cold water swellable starch.

The mass percentage of the swollen particles of cold water swellable starch relative to the total mass of the liquid seasoning of the present invention can be adjusted, e.g., by sufficiently impregnating cold water swellable starch with water, placing the impregnated cold water swellable starch on a 4-mesh sieve and a 100-mesh sieve to select the swollen particles which pass through the 4-mesh sieve and do not pass through the 100-mesh sieve, determining the mass ratio of the swollen particles which pass through the 4-mesh sieve and do not pass through the 100-mesh sieve relative to the total mass of the swollen particles of cold water swellable starch, and adjusting the mass percentage of the swollen particles of cold water swellable starch based on the determined mass ratio.

The liquid seasoning of the present invention may preferably contain particles (e.g., particles of the crushed plant material and/or the cold water swellable starch) which do not pass through a 100-mesh sieve in a certain amount. Specifically, the mass percentage of the particles which do not pass through a 100-mesh sieve (i.e., which remain on a 100-mesh sieve) relative to the total mass of the liquid seasoning may preferably be 1% by mass or more, particularly 2% by mass or more, and preferably be 80% by mass or less, particularly 75% by mass or less. If this parameter falls short of the above range, the foam breaking property of the liquid seasoning may not be sufficient. On the other hand, if this parameter exceeds the above range, the flowability of the liquid seasoning may not be maintained. The mass percentage of the particles which do not pass through a 100-mesh sieve relative to the total mass of the liquid seasoning can be measured, e.g., by diluting the liquid seasoning with water as appropriate (by about 10 to 20 times), placing the diluted seasoning on a 100-mesh sieve to select the particles which remain on the sieve, and weighing the remaining particles after sufficiently draining water.

<Vinegar> the liquid seasoning of the present invention contains a vinegar. The "vinegar" used herein may be a fermented vinegar, which is produced from a grain such as rice or wheat or a fruit juice as a raw material, or a synthetic vinegar, which is produced from a dilute solution of glacial acetic acid or acetic acid by adding seasoning such as sugar or by adding a fermented vinegar. Examples of fermented vinegars include: rice vinegar; grain vinegars (e.g., brown rice vinegar, black vinegar, lees vinegar, malt vinegar, hato vinegar, soy vinegar, etc.); fruit vinegars (e.g., apple vinegar, grape vinegar, lemon vinegar, kabosu vinegar, plum vinegar, wine vinegar, balsamic vinegar, etc.); and vinegars produced by acetic acid fermentation using ethanol as a raw material (e.g., sake vinegar, Chinese vinegar, sherry vinegar, etc.). Examples of synthetic vinegars include dilutions of glacial acetic acid or acetic acid with water as appropriate. These vinegars may be used either singly or in combination of two or more. It is especially preferred in the present invention to use a fermented or synthetic vinegar with high acetic acid concentration, which contains a large amount of acetic acid and has a weak flavor derived from the raw material. The percentage of the vinegar relative to the total mass of the liquid seasoning of the present invention may be, although not limited, adjusted based on various conditions, such as acetic acid concentration, pH, and dissociated acetic acid concentration, which will be explained below.

<Acetic Acid and Dissociated Acetic Acid Concentration>

The liquid seasoning of the present invention contains acetic acid, which may be derived primarily from vinegar but also may be derived from any other ingredient. Including acetic acid into the liquid seasoning helps make the flavor of vegetable or fruit derived from the crushed plant material be felt more favorably. In addition, inclusion of acetic acid serves to compensate for the flavor lost during the preparation of the crushed plant material, and make the flavor of the crushed plant material be felt fresher. The "acetic acid" herein refers to acetic acid molecules ($CH_3COOH$) and acetate ions ($CH_3COO^-$) derived from raw materials and/or additives, and the acetic acid content in the liquid seasoning of the present invention refers to the total concentration of these acetic acid molecules and acetate ions. The acetic acid may preferably be derived from vinegar, which is a food material.

The content of acetic acid in the liquid seasoning of the present invention is not particularly limited. However, from the viewpoint of enhancing the taste of a salad or cooked food to be seasoned, the mass percentage of acetic acid relative to the total mass of the liquid seasoning may preferably be 0.1% by mass or more, particularly 0.15% by mass or more. If this parameter falls short of the above range, the flavor of acetic acid may not be felt sufficiently, and the taste of the seasoning may be blurred. On the other hand, from the viewpoint of taste balance, the mass percentage of acetic acid relative to the total mass of the liquid seasoning may preferably be 15% by mass or less, particularly 10% by mass or less. If this parameter exceeds the above range, sourness and acetic acid odor may be felt more prominent than the flavor of the plant crushed product and disturb the flavor balance of the entire seasoning.

The liquid seasoning of the present invention may be characterized by having a dissociated acetic acid concentration within a predetermined range. The "dissociated acetic acid concentration" used herein means the content of dissociated acetic acid. Specifically, acetic acid molecules are known to exist in aqueous solution either in the dissociated state or in the associated state, which states are in equilibrium. Assuming that the dissociated acetic acid concentration is $[A^-]$, the proton concentration is $[H^+]$, and the associated acetic acid concentration (i.e., [acetic acid concentration]–[dissociated acetic acid concentration]) is $[AH]$, these states co-exist in equilibrium satisfying the following formula.

[Formula 1]

$$[AH] \longleftrightarrow [H^+]+[A^-] \quad \text{[Formula 1]}$$

The dissociated acetic acid concentration $[A^-]$ can be calculated from the pH and the acetic acid concentration in accordance with the following formula.

[Formula 2]

$$[pH]=4.76+\log_{10}[A^-]/[AH] \quad \text{[Formula 2]}$$

Specifically, the dissociated acetic acid concentration of the liquid seasoning of the present invention should be 0.16% by mass or less, preferably 0.15% by mass or less, more preferably 0.13% by mass or less. Adjusting the dissociated acetic acid concentration to the above upper limit or less serves to compensate for the plant-derived flavor lost during the preparation steps of crushed plant material (such as crushing and concentrating) and restore a fresh plant-like flavor. On the other hand, the lower limit of the dissociated acetic acid concentration is not particularly limited. However, from the viewpoint of improving the flavor of the seasoning as a whole, the dissociated acetic acid concentration may preferably be 0.002% by mass or more, particularly 0.005% by mass or more, more particularly 0.01% by mass or more. The dissociated acetic acid concentration of the liquid seasoning can be calculated by measuring the acetic acid concentration and the pH of the liquid seasoning and assigning them into Formula 2 above.

<pH>

The pH of the liquid seasoning of the present invention is not particularly limited as long as it has an acidic pH value (pH less than 7). Usually, the pH of the liquid seasoning may be determined from the viewpoint of the balance between the flavor and the taste as well as the dissociated acetic acid concentration mentioned above. However, the pH of the liquid seasoning may preferably be, although not particularly limited to, 2.2 or more, particularly 2.5 or more, more particularly 2.8 or more, and preferably be 4.8 or less, particularly 4.6 or less, more particularly 4.4 or more.

<Viscosity>

From the viewpoint of suppressing the generation and retention of air bubbles after mixing by stirring or shaking, the liquid seasoning of the present invention may preferably have a viscosity within a predetermined range. Specifically, the viscosity of the liquid seasoning at 20° C. may preferably be 500 mPa·s or more, particularly 600 mPa·s or more, more particularly 700 mPa·s or more, and preferably be 10000 mPa·s or less, particularly 9500 mPa·s or less, more particularly 9000 mPa·s or less. If the viscosity of the liquid seasoning at 20° C. falls short of the above range, it may be difficult to prevent the crushed plant material contained in the liquid seasoning, or even the liquid seasoning itself, from dripping off from the food to be seasoned. On the other hand, if the viscosity exceeds the above range, it may be difficult to suppress the generation and retention of air bubbles after mixing by stirring or shaking.

The viscosity of the liquid seasoning of the present invention at 20° C. can be measured by a method known to those skilled in the art. For example, measurement can be made using a commercially available B-type viscometer (which represents a single cylindrical rotational viscometer and is also commonly referred to as a Brookfield rotational viscometer; an example is "B-II" manufactured by Toki Sangyo Co., Ltd.) or any other viscometer. Specifically, the viscosity can be measured by loading an appropriate amount of the liquid seasoning, adjusted to 20° C., into a measuring container of a B-type viscometer, setting the container in the B-type viscometer, and measuring the viscosity at a suitable rotation speed using a rotor suitable for the viscosity to be measured.

<Embodiments of the Liquid Seasoning and Other Materials Thereof>

The liquid seasoning of the present invention may be any type of liquid seasoning. Examples include: a non-oil type, which does not contain fats and/or oils; a low-oil type (10 mass % or less), which contains a reduced amount of fats and/or oils; and an oil type, which contains fats and/or oils (including an emulsification type and a separation type). The liquid seasoning of the present invention may be any of these types, but may preferably be a non-oil type, since the flavor of the crushed plant material may easily be felt.

The liquid seasoning of the present invention may contain, in addition to the above-mentioned materials, any other materials which are used in conventional liquid seasonings depending on the type thereof. Such materials may differ depending on the mode of the liquid seasoning.

For example, when the liquid seasoning of the present invention is a non-oil type dressing, basic raw materials generally used may include water, sugars (including high-intensity sweeteners), and salt. Examples of raw materials which can be used for the liquid seasoning of the present invention in addition to such basic materials include: taste and flavor components, such as condiments, condiment extracts, flavor oils, amino acid seasonings, nucleic acid seasonings, organic acid seasonings, flavor materials, umami seasonings, alcoholic beverages, and flavors; and additives such as viscosity modifiers other than gums and cold water swellable starches, stabilizers, colorants, and calcium salts, etc. The contents of these components are not particularly limited, and can be appropriately determined according to the uses of the liquid seasoning.

Examples of sugars include: table sugar (sucrose), maltose, fructose, isomerized sugar, glucose, starch syrup, dextrin, sorbitol, and sugar alcohols such as maltitol and xylitol. These sugars may be used either singly or in any combination of two or more at any ratios.

Examples of high-intensity sweeteners include: aspartame, acesulfame potassium, sucralose, neotame, licorice extract, *stevia* and its enzyme-treated products. These high-intensity sweeteners may be used either singly or in any combination of two or more at any ratios.

Salts may be used either as pure sodium chloride or as a food containing sodium chloride. Examples of foods containing sodium chloride include, although not particularly limited to: soy sauce, miso (fermented soybean paste), soup stock, and the like.

Examples of soy sauces include, although not particularly limited to: dark (koikuchi) soy sauce, light (usukuchi) soy sauce, white soy sauce, tamari (gluten-free) soy sauce, and sai-jikomi (restock) soy sauce. These soy sauces may be used either singly or in any combination of two or more at any ratios.

Examples of misos include, although not particularly limited to: wheat miso, rice miso, soybean miso, and mixed miso. Misos are also classified into red miso, white miso, light-colored miso, etc., depending on the difference in color due to its manufacturing method. These misos may be used either singly or in any combination of two or more at any ratios.

Condiments are derived from plant parts (e.g., fruits, pericarps, flowers, buds, barks, stems, leaves, seeds, roots, rhizomes, etc.) having peculiar scents, pungent tastes, and/or strong color tones, and added to foods and/or drinks for the purpose of, e.g., flavoring, deodorizing, seasoning, and coloring. Condiments include spices and herbs. Spices refer to condiments derived from plant parts other than stems, leaves, and flowers. Examples of spices include: peppers (black pepper, white pepper, red pepper), garlic, ginger, sesame (sesame seed), chili pepper, horseradish, mustard, poppy, yuzu, nutmeg, cinnamon, paprika, cardamom, cumin, saffron, allspice, cloves, sansho (Japanese pepper), orange peel, fennel, licorice, fenugreek, dill seed, huajiao (Sichuan pepper), long pepper, and olive fruit. Herbs refer to condiments derived from stems, leaves, or flowers. Examples of herbs include: watercress, coriander, shiso (Japanese basil), celery, tarragon, chive, chervil, sage, thyme, laurel, leek, parsley, mustard greens, mustard green, myoga (*Zingiber mioga*, Japanese ginger), yomogi (mugwort), basil, oregano, rosemary, peppermint, savory, lemongrass, dill, wasabi leaf, and sansho (Japanese pepper) leaf.

Condiment extracts may be extracts of any foods generally referred to as "condiments" or "spices." Examples of condiment extracts include: chili extract, mustard extract, ginger extract, wasabi extract, pepper extract, garlic extract, onion extract, and sansho (Japanese pepper) extract. These condiment extracts may be used either singly or in any combination of two or more at any ratios.

Examples of flavor oils include: ginger oil, garlic oil, mustard oil, onion oil, sesame oil, negi (green onion) oil, nira (Chinese chive) oil, seri (Japanese parsley) oil, shiso (Japanese basil) oil, wasabi oil, lemon oil, seafood oil, and meat storage oil. These flavor oils may be used either singly or in any combination of two or more at any ratios.

Examples of amino acid seasonings include: sodium L-glutamate, DL-alanine, glycine, L- or DL-tryptophan, L-phenylalanine, L- or DL-methionine, L-lysine, L-aspartic acid, sodium L-aspartate, and L-arginine. These amino acid seasonings may be used either singly or in any combination of two or more at any ratios.

Examples of nucleic acid seasonings include: disodium 5'-inosinate, disodium 5'-guanylate, disodium 5'-uridylate, disodium 5'-cytidylate, calcium 5'-ribonucleotide, and disodium 5'-ribonucleotide. These nucleic acid seasonings may be used either singly or in any combination of two or more at any ratios.

Examples of organic acid seasonings include: calcium citrate, trisodium citrate, potassium gluconate, sodium gluconate, succinic acid, monosodium succinate, disodium succinate, sodium acetate, potassium hydrogen DL-tartrate, potassium hydrogen L-tartrate, sodium DL-tartrate, sodium L-tartrate, potassium lactate, calcium lactate, sodium lactate, monosodium fumarate, and DL-sodium malate. These organic acid seasonings may be used either singly or in any combination of two or more at any ratios. It is preferable to use two or more organic acid seasonings in combination, since the tastes of both seasonings may be enhanced synergistically.

Examples of flavor materials include: dashi (soup stock) extracted from bonito, dashi extracted from kelp, vegetable extract, bonito extract, kelp extract, seafood extract, and meat storage extract. These flavor materials may be used either singly or in any combination of two or more at any ratios.

Examples of umami seasonings include: protein hydrolyzates and yeast extracts. These umami seasonings may be used either singly or in any combination of two or more at any ratios.

Examples of alcoholic beverages include: sake, synthetic sake, mirin (Japanese sweet rice wine), shochu, wine, liquor, and Shaoxing rice wine. These alcoholic beverages may be used either singly or in any combination of two or more at any ratios.

Examples of flavors include: ginger flavor, garlic flavor, mustard flavor, onion flavor, sesame seeds flavor, negi (green onion) flavor, nira (Chinese chive) flavor, shiso (Japanese basil) flavor, wasabi flavor, and lemon flavor. These flavors may be used either singly or in any combination of two or more at any ratios.

Examples of viscosity modifiers include: alginic acid, sodium alginate, carrageenan, karaya gum, agar, cellulose, tamarind seed gum, pullulan, pectin, chitin, and chitosan. These viscosity modifiers may be used either singly or in any combination of two or more at any ratios.

<Process of Producing the Liquid Seasoning>

The liquid seasoning of the present invention can be manufactured by a process including mixing the components explained above, i.e., a crushed plant material, a gum, a cold water swellable starch, and a vinegar, optionally with one or more other components in such a manner that the viscosity at 20° C. and the dissociated acetic acid concentration of the resultant mixture satisfy their respective predetermined ranges explained above. The mixing may be carried out either by stirring or by shaking, optionally with heating if necessary. The mixing or stirring of the raw materials may be carried out by a conventionally known method. The temperature during mixing or stirring may usually be 35° C. or higher, preferably 40° C. or higher. When mixing is performed while heating, the upper limit of the heating temperature is usually 100° C. or lower, preferably 90° C. or lower, and more preferably 85° C. or lower, in order to suppress dissolution of the cold water swellable starch.

After made into a uniform liquid by the above steps, the mixture is optionally subjected to a sterilization treatment such as heat sterilization or membrane filtration sterilization, and then is filled in a container in the same manner as a general liquid seasoning. The container used for the liquid seasoning of the present invention is not particularly limited in material and shape. Examples thereof include: plastic containers, pouches (e.g., polyethylene pouches and aluminum pouches), PET bottles, steel cans, aluminum cans, and bottle containers. After being filled in a container, the liquid seasoning of the present invention may be subjected to sterilization treatment such as heat sterilization or retort sterilization, and shipped as a liquid seasoning product. Such a process of producing the liquid seasoning is also included in an aspect of the present invention.

<Usage of the Liquid Seasoning Containing a Crushed Plant Material>

The mode of using the liquid seasoning of the present invention is not particularly limited. It can be sprinkled or seasoned on a foodstuff or cooked food such as vegetable, seafood, or meat. The foodstuff or cooked food for which the liquid seasoning of the present invention is used may be either in a heated state or a non-heated state. However, the liquid seasoning of the present invention may preferably be used for salad, fried food, grilled food (e.g., meat steak or grilled fish), tofu, pasta, etc., in a non-heated state.

<Method for Improving the Color, Flavor and Texture of Plant Material and Method for Improving the Foam-Breaking Property after Mixing by Stirring or Shaking>

The above-described process of producing the liquid seasoning of the present invention can be utilized in a method for improving the color tone, flavor, and texture of the crushed plant material and/or for improving the foam-breaking property after mixing by stirring and shaking. Specifically, the method include mixing the components explained above, i.e., a crushed plant material, a gum, a cold water swellable starch, and a vinegar, optionally with one or more other components in such a manner that the viscosity at 20° C. and the dissociated acetic acid concentration of the resultant mixture satisfy their respective predetermined ranges explained above. These methods allow for improvement of the color tone, flavor, and texture of a crushed plant material in an acidic liquid seasoning and/or for improvement of the foam-breaking property of an acidic liquid seasoning containing a crushed plant material after mixing by stirring and shaking. These methods (i.e., the method for improving the color, flavor and texture of plant material and the method for improving the foam-breaking property after mixing by stirring or shaking) are also included in aspects of the present invention.

SUMMARY

The present invention provides an acidic liquid seasoning containing a crushed plant material which is excellent in the foam breaking property after mixing by stirring or shaking, and exhibits the desirable flavor and texture and vivid color tone originally possessed by the crushed plant material. Specifically, the acidic liquid seasoning containing a crushed plant material according to the present invention is excellent in the foam breaking property, with suppressed generation and retention of air bubbles after mixing by stirring or shaking, which is commonly seen in conventional acidic liquid seasonings containing crushed plant materials. This property serves to prevent the acidic liquid seasoning of the present invention from leaking out of a tank or a container, whereby the productivity is significantly improved. The acidic liquid seasoning of the present invention exhibits suppressed generation or retention of air bubbles after being mixed by shaking prior to use for a food. This property serves to prevent the original color tone of the crushed plant material from being masked by air bubbles and turning whitish. Furthermore, since the acidic liquid seasoning of the present invention has reduced property of retaining air bubbles in the seasoning liquid, the original flavor and texture of the crushed plant material can be strongly felt in the mouth, without being obstructed by the stimulus and lumpy texture of air bubbles.

EXAMPLES

The present invention will be described hereinafter in more detail with reference to specific Examples, which are presented merely for convenience of explanation, and the present invention should not be limited to these Examples in any way.

Example 1

Studies on the contents and viscosities of thickeners
(1) Preparation of Test Samples
According to each of the compositions shown in Table 1 shown as FIG. 1, tomato paste (crushed plant material), sodium chloride, sucrose, fermented vinegar (acidity 15%), and water were blended, to which xanthan gum (gum) and cold water swellable starch were added with varying the combination and the blending ratios. The mixture was well mixed and homogenized by stirring at 60° C., then sterilized at 90° C. for 5 minutes, and filled into a bottle, whereby Test Samples 1 to 8 of acidic liquid seasonings were prepared. The tomato paste used was one which, if placed on a 100-mesh sieve, 90% by mass or more thereof remains on the 100-mesh sieve.

(2) Evaluation of Test Samples

[Measurement of Viscosity]

The test samples prepared in (1) above were subjected to the measurement of viscosity according to the following method: "B-II" manufactured by Toki Sangyo Co., Ltd. was used as a B-type viscometer. An appropriate amount of each test sample, adjusted to 20° C., was loaded into a measurement container, which was then set in the B-type viscometer. After setting, the viscosity was measured at an appropriate rotation speed using a rotor suitable for the range of viscosity to be measured.

[Measurement of pH and Calculation of Dissociated Acetic Acid Concentration]

Each of the test seasoning samples prepared in Section (1) above was subjected to the measurement of pH using a pH meter. The acetic acid concentration of each seasoning sample was calculated from the content and acidity of the vinegar used. The measured pH and the calculated acetic acid concentration of each seasoning sample were used for calculating the dissociated acetic acid concentration according to the following formula.

[Formula 3]

$$[pH]=4.76+\log_{10}[A^-]/[AH]$$ Formula 2

In the formula, $[A^-]$ refers to the concentration of acetic acid in the dissociated state (i.e., dissociated acetic acid concentration), and $[AH]$ refers to the concentration of acetic acid in the associated state (i.e., a difference between the acetic acid concentration and the dissociated acetic acid concentration).

[Measurement of the Percentage of all 100-Mesh-on Ingredients]

Each of the test samples prepared in Section (1) above was subject to the measurement of the mass percentage of all 100-mesh-on ingredients relative to the total mass of the test seasoning sample in accordance with the following method: the test seasoning sample was diluted 10 times with water, then placed on a 100-mesh sieve to obtain ingredients that did not pass through the 100-mesh sieve, and the mass of the ingredients was measured to determine the percentage of these ingredients relative to the seasoning.

[Measurement of the Percentage of the Swollen Particles of Cold Water Swellable Starch]

Each of the test samples prepared in Section (1) above was subject to the measurement of the mass percentage of the swollen particles of cold water swellable starch relative to the total mass of the test seasoning sample in accordance with the following method: the test seasoning sample was diluted 10 times with water, then placed on a 100-mesh sieve and a 4-mesh sieve to obtain particles that did not pass through the 100-mesh sieve and passed through the 4-mesh sieve. Taking the composition of the test product into consideration, it was deemed that the ingredients that did not pass through the 100-mesh sieve consisted only of the swollen particles of cold water swellable starch and crushed plant material. The swollen particles of cold water swellable starch were visually identified and separated from the swollen particles of crushed plant material. In parallel, the same amount of cold water swellable starch in a dried state as that used for preparing the test seasoning sample was prepared and impregnated with a sufficient amount of cold water (25° C.), and then placed on a 100-mesh sieve to obtain the particles which did not pass through the 100-mesh sieve. The masses of the swollen particles obtained via these procedures were found to be almost the same. Therefore, for the sake of simplicity, the value obtained by the latter procedure was used as the mass of the swollen particles of cold water swellable starch in order to calculate the mass percentage relative to the seasoning sample.

[Measurement of the Percentage of the Swollen Particles of Crushed Plant Material]

Each of the test samples prepared in Section (1) above was subject to the measurement of the mass percentage of the swollen particles of crushed plant material relative to the total mass of the test seasoning sample in accordance with the following method: the test seasoning sample was diluted 10 times with water, then placed on a 100-mesh sieve and a 9-mesh sieve to obtain particles that did not pass through the 100-mesh sieve and passed through the 9-mesh sieve. Taking the composition of the test product into consideration, it was deemed that the ingredients that did not pass through the 100-mesh sieve consisted only of the swollen particles of cold water swellable starch and crushed plant material. The swollen particles of crushed plant material were visually identified and separated from the swollen particles of cold water swellable starch. In parallel, the same amount of crushed plant material in a dried state as that used for preparing the test seasoning sample was prepared and impregnated with a sufficient amount of cold water (25° C.), and then placed on a 100-mesh sieve to obtain the particles which did not pass through the 100-mesh sieve. The masses of the swollen particles obtained via these procedures were found to be almost the same. Therefore, for the sake of simplicity, the value obtained by the latter procedure was used as the mass of the swollen particles of crushed plant material in order to calculate the mass percentage relative to the seasoning sample.

[Sensory Evaluation]

Each of the test samples prepared in Section (1) above was subject to the sensory evaluation of "the foam breaking property after shaking" and "the color tone after shaking." The sensory evaluation was carried out by five skilled panelists, and the criteria for each evaluation item were as explained later. The panelists evaluated each item on a 3-grade scale of "good," "average," and "bad". It was concluded that the effect of the present invention was observed only when the majority of the panelists (3 out of 5) chose "good" and no panelist chose "bad." The panelists who carried out the sensory evaluation were familiar with commercially available liquid seasonings generally distributed on the market, and also know the ordinary level of the foam breaking property, color tone, flavor, and texture of the commercially available products (which correspond to the "average" level on the evaluation scale).

(Foam Breaking Property after Shaking)

A bottle containing each test sample was shaken up and down in a length of 30 cm at a speed of 2 cycles per second for 15 seconds, left to stand for 3 minutes, and then visually observed for the appearance of the liquid seasoning in the container. The foam breaking property was evaluated on the following scale.

A: good (substantially no bubbles were observed in the upper part of the liquid, and almost no bubbles were found in the middle part of the liquid.)
B: average (a foaming layer of more than 1 cm in height was observed in the upper part of the liquid, and also bubbles were observed in most of the liquid.)
C: bad (a vigorous foaming layer of 2 cm or more was observed at the upper part of the liquid, and bubbles are observed almost all over the liquid.)
(Color Tone after Shaking)

A bottle containing each test sample was shaken up and down in a length of 30 cm at a speed of 2 cycles per second for 15 seconds, left to stand for 3 minutes, and then visually observed for the appearance of the liquid seasoning in the container. The color tone was evaluated on the following scale.
A: good (substantially no change in color tone was observed before and after shaking, and no turbidity occurred after shaking.)
B: average (a little change in color tone was observed before and after shaking, but no turbidity occurred after shaking.)
C: bad (a clear change in color tone was observed before and after shaking, and turbidity occurred after shaking.)
(3) Evaluation Results of Test Samples Table 1 (as FIG. 1) shows the composition of Test Samples 1 to 8 along with the measurement results of the viscosity and the percentages of the swollen particles of cold water swellable starch and crushed plant material and the sensory evaluation results thereof. In Table 1 and the subsequent tables, the "percentage" refers to the percentage relative to the seasoning, unless otherwise specified.

As shown in Table 1, the liquid seasonings of Test Samples 3 to 6 and 8 contained tomato paste as a crushed plant material, as well as sodium chloride, sucrose, and fermented vinegar (acidity 15%), and also containing cold water swellable starch and xanthan gum (gum) as thickeners, had a dissociated acetic acid concentration adjusted to 0.15% by mass or less, and also had a viscosity of within the range of 500 to 10000 mPa·s. These samples exhibited suppressed generation of bubbles and lowered retention of bubbles after mixing, and were excellent in the overall foam breaking property. In addition, each of these samples did not turn into whitish due to air bubbles after shaking, exhibited almost no change in color tone before and after shaking, and maintained the vivid color of the crushed plant material. On the other hand, the liquid seasoning of Test Sample 1, which had a viscosity of less than 500 mPa·s, the liquid seasoning of Test Sample 7, which had a viscosity of higher than 10,000 mPa·s, and the liquid seasoning of Test Sample 2, which did not contain cold water swellable starch as a thickener, were inferior in the foam breaking property, and were also insufficient in terms of other evaluation items.

Example 2

Studies on the Percentage of the Crushed Plant Material
(1) Preparation of Test Samples According to each of the compositions shown in Table 2 shown as FIG. 2, sodium chloride, sucrose, fermented vinegar (acidity 15%), xanthan gum (gum), cold water swellable starch, and water were blended, to which tomato paste A (crushed plant material) was added with varying the combination and the blending ratios. The mixture was well mixed and homogenized by stirring at 60° C., then sterilized at 90° C. for 5 minutes, and filled into a bottle, whereby Test Samples 9 to 11 of acidic liquid seasonings were prepared.

The tomato paste A used was one which, if placed on a 100-mesh sieve, 90% by mass or more thereof remains on the 100-mesh sieve.
(2) Evaluation of Test Samples Test Samples 9 to 11 prepared in Section (1) above were subjected to the measurement of the viscosity and the percentages of the swollen particles of cold water swellable starch and crushed plant material and the sensory evaluation, in accordance with the same procedures as used in Example 1(2) above.
(3) Evaluation Results of Test Samples Table 2 shows the composition of Test Samples 9 to 11 along with the measurement results of the viscosity and the percentages of the swollen particles of cold water swellable starch and crushed plant material and the sensory evaluation results thereof.

As shown in Table 2, the liquid seasonings of Test Samples 9 to 11 contained tomato paste as a crushed plant material, as well as sodium chloride, sucrose, and fermented vinegar (acidity 15%), and also containing cold water swellable starch and xanthan gum (gum) as thickeners, had a dissociated acetic acid concentration adjusted to 0.15% by mass or less, and also had a viscosity of within the range of 500 to 10000 mPa·s. In each of these test samples, the mass percentage of the tomato paste was within the range of 0.3 to 20% by mass, and the mass percentage of the 100-mesh-on swollen particles and the content of the 9-mesh-pass/100 mesh-on swollen particles are each within the range of from 0.6 to 40% by mass. These samples exhibited suppressed generation of bubbles and lowered retention of bubbles after mixing, and were excellent in the overall foam breaking property. In addition, each of these samples did not turn into whitish due to air bubbles after shaking, exhibited almost no change in color tone before and after shaking, and maintained the vivid color of the crushed plant material.

Example 3

Studies on the Dissociated Acetic Acid Concentration
(1) Preparation of Test Samples According to each of the compositions shown in Table 3 shown as FIG. 3, the tomato paste A (crushed plant material) above, sodium chloride, sucrose, xanthan gum (gum), cold water swellable starch, and water were blended, to which fermented vinegar (acidity 15%) was added with varying the combination and the blending ratios. The mixture was well mixed and homogenized by stirring at 60° C., then sterilized at 90° C. for 5 minutes, and filled into a bottle, whereby Test Samples 12 to 17 of acidic liquid seasonings were prepared.
(2) Evaluation of Test Samples Test Samples 12 to 17 prepared in Section (1) above were subjected to the measurement of the viscosity and the percentages of the swollen particles of cold water swellable starch and crushed plant material and the sensory evaluation, in accordance with the same procedures as used in Example 1(2) above.
(3) Evaluation Results of Test Samples Table 3 shows the composition of Test Samples 12 to 17 along with the measurement results of the viscosity and the percentages of the swollen particles of cold water swellable starch and crushed plant material and the sensory evaluation results thereof.

As shown in Table 3, the liquid seasonings of Test Samples 12, 13, 16, and 17 contained tomato paste as a crushed plant material, as well as sodium chloride, sucrose, and fermented vinegar (acidity 15%), and also containing cold water swellable starch and xanthan gum (gum) as thickeners, had a viscosity of within the range of 500 to 10000 mPa·s, and also had a dissociated acetic acid concentration adjusted to 0.15% by mass or less. These samples exhibited suppressed generation of bubbles and lowered retention of bubbles after mixing, and were excellent in the overall foam breaking property. In addition, each of these samples did not turn into whitish due to air bubbles after shaking, exhibited almost no change in color tone before and after shaking, and maintained the vivid color of the crushed plant material. On the other hand, the liquid seasonings of Test Samples 14 and 15, which had a dissociated the acetic acid concentration of higher than 0.15% by mass, were inferior in the foam breaking property, and were also insufficient in terms of other evaluation items.

Example 4

(1) Preparation of Test Samples

According to each of the compositions shown in Tables 4-1 and 4-2 (FIGS. 4A and 4B), sodium chloride, sucrose, and water were blended, to which crushed plant material, gum, and vinegar were added with varying the combination and the blending ratios, whereby Test Samples 18 to 27 of acidic liquid seasonings were prepared.

(2) Evaluation of Test Samples

Test Samples 18 to 27 prepared in Section (1) above were subjected to the measurement of the viscosity and the percentages of the swollen particles of cold water swellable starch and crushed plant material and the sensory evaluation, in accordance with the same procedures as used in Example 1(2) above.

(3) Evaluation Results of Test Samples

Tables 4-1 to 4-4 (FIGS. 4A to 4D) show the composition of Test Samples 18 to 27 along with the measurement results of the viscosity and the percentages of the swollen particles of cold water swellable starch and crushed plant material and the sensory evaluation results thereof.

As shown in Tables 4-1 to 4-4, the liquid seasonings of Test Samples 18 to 27 exhibited suppressed generation of bubbles and lowered retention of bubbles after mixing, and were excellent in the overall foam breaking property. In addition, each of these samples did not turn into whitish due to air bubbles after shaking, exhibited almost no change in color tone before and after shaking, and maintained the vivid color of the crushed plant material. The brilliant color derived from the crushed plant material was especially well maintained in each of the test samples using tomato puree, cucumber, red pepper, carrot, and orange as crushed plant material, which each originally have a vivid color tone.

INDUSTRIAL APPLICABILITY

The present invention can be widely used for a variety of acidic liquid seasonings containing crushed plant in the field of foods, and therefore has a high degree of industrial applicability.

The invention claimed is:

1. An acidic liquid seasoning comprising: a crushed plant material; a gum; a cold water swellable starch; and a vinegar,
wherein the acidic liquid seasoning has
(A) a viscosity at 20° C. of between 500 mPa·s and 10000 mPa·s, and
(B) a dissociated acetic acid concentration of 0.16% by mass or less,
wherein a percentage of swollen particles of the cold water swellable starch which pass a 4-mesh sieve complying with the JIS standard but remain on a 100-mesh sieve complying with the JIS standard is between 0.5% and 50% by mass relative to a total mass of the acidic liquid seasoning,
wherein a percentage of swollen particles of the crushed plant material which pass a 9-mesh sieve complying with the JIS standard but remain on a 100-mesh sieve complying with the JIS standard is between 0.2% and 50% by mass relative to the total mass of the acidic liquid seasoning, and
wherein the cold water swellable starch is selected from the group consisting of pregelatinized starch, distarch phosphate, acetylated distarch adipate, acetylated distarch phosphate, acetylated oxidized starch, starch sodium octenylsuccinate, starch acetate, oxidized starch, hydroxypropyl starch, hydroxypropyl distarch phosphate, phosphated distarch phosphate, monostarch phosphate, and combinations thereof.

2. The acidic liquid seasoning according to claim 1, wherein a percentage of swollen particles of the crushed plant material which remain on a 100-mesh sieve is between 0.2% and 60% by mass relative to a total mass of the acidic liquid seasoning.

3. The acidic liquid seasoning according to claim 1, wherein a percentage of all particles excluding swollen particles of the cold water swellable starch which remain on a 100-mesh sieve is between 0.2% and 60% by mass relative to a total mass of the acidic liquid seasoning.

4. The acidic liquid seasoning according to claim 1, wherein a percentage of all particles excluding swollen particles of the cold water swellable starch which pass a 9-mesh sieve but remain on a 100-mesh sieve is between 0.2% and 50% by mass relative to the total mass of the acidic liquid seasoning.

5. The acidic liquid seasoning according to claim 1, wherein the crushed plant material is a paste or puree of plant-derived foodstuff.

6. The acidic liquid seasoning according to claim 1, wherein the crushed plant material is derived from one or more selected from the group consisting of tomato, cucumber, apple, ginger, onion, orange, mandarin orange (citrus unshiu), lemon, garlic, carrot, paprika, red bell pepper, and daikon (Japanese radish).

7. The acidic liquid seasoning according to claim 1, wherein the gum is one or more selected from xanthane gum, guar gum, locust bean gum, tamarind seed gum, and starch.

8. The acidic liquid seasoning according to claim 1, which has a pH of between 2.2 and 4.8.

9. The acidic liquid seasoning according to claim 1, which has an acetic acid concentration of 0.1% by mass or more.

10. A process for producing an acidic liquid seasoning, comprising:
mixing a crushed plant material, a gum, a cold water swellable starch, and a vinegar,
optionally with one or more other ingredients, such that the resultant mixture has:
(A) a viscosity at 20° C. of between 500 mPa·s and 10000 mPa·s, and
(B) a dissociated acetic acid concentration of 0.16% by mass or less,
wherein a percentage of swollen particles of the cold water swellable starch which pass a 4-mesh sieve complying with the JIS standard but remain on a 100-mesh sieve complying with the JIS standard is between 0.5% and 50% by mass relative to a total mass of the acidic liquid seasoning, wherein a percentage of swollen particles of the crushed plant material which pass a 9-mesh sieve complying with the JIS standard but remain on a 100-mesh sieve complying with the JIS standard is between 0.2% and 50% by mass relative to the total mass of the acidic liquid seasoning, and wherein the cold water swellable starch is selected from the group consisting of pregelatinized starch, distarch phosphate, acetylated distarch adipate, acetylated distarch phosphate, acetylated oxidized starch, starch sodium octenylsuccinate, starch acetate, oxidized starch, hydroxypropyl starch, hydroxypropyl distarch phosphate, phosphated distarch phosphate, monostarch phosphate, and combinations thereof.

11. The process according to claim 10, wherein the mixing is carried out at a temperature of between 35° C. and 100° C.

\* \* \* \* \*